Patented June 19, 1945

2,378,533

UNITED STATES PATENT OFFICE 2,378,533

METHOD FOR PROCESSING AND CONCENTRATING FRUIT JUICES

Jorgen Dietz Bering, Pasadena, Calif.

No Drawing. Application May 20, 1941,
Serial No. 394,332

10 Claims. (Cl. 99—205)

This invention relates to the processing of fruit juices and to the production of new and useful products containing such processed juices. It is the object of this invention to provide certain fruit juice products of a new composition and of certain new and useful characteristics and to provide methods for the manufacture of such products. More specifically, the invention relates to new fruit juice products in which part of or the entire fruit juice content is present in the form of concentrated fruit juice, and to methods for processing and concentrating fruit juice and for incorporating the concentrate in these new fruit juice products which may consist entirely or only partly of this concentrate.

The art of concentrating juices is well known, especially in case of citrus juices with which this invention is primarily concerned. The invention is however not confined to citrus juices and may be applied to such fruit and vegetable juices that possess characteristics similar to those of citrus juices and involved in the procedures herein described and as in the case of pineapplie juice and tomato juice.

During the concentration of a fruit juice part of its water is removed and it is converted into a syrup of several times its original solid content. The evaporation is performed under vacuum so that the development of off flavors and the destruction and inter-reaction of various constituents of the juice at higher temperatures are avoided.

Hitherto the purpose of industrial concentration of citrus juices has merely been to take advantage of the improved keeping quality through the raise in soluble solid content and of the reduction in container and storage and transportation cost by the contraction of the commercial juice product. Consequently the usage of concentrated citrus juices has hitherto been connected with their redilution.

This limitation in usefulness of such concentrated juices is due to certain specific factors. One is related to the natural acid content of the juice. As the juice is being concentrated its acidity goes up in the same ratio as its total solid content is being increased. If orange juice of average composition (12% soluble solids, 1% anhydrous citric acid, the balance of solids (11%) consisting chiefly of sugars) is concentrated six time by weight, the soluble solid content of the concentrate (if the minor effect of suspended solids is disregarded) will be 72% and its acidity 6% anhydrous citric acid. A product of this composition is extremely and unpalatably sour and acid and cannot be considered edible until it has been diluted approximately back to its original strength with non-acid materials.

Another factor limiting the usefulness of concentrated citrus juices is related to the generally known flavor deterioration. A few hours after the citrus juice has been extracted a radical flavor change takes place; the fresh fruit juice flavor is weakened and off-flavors develop. In concentrated citrus juices this flavor deterioration is usually very pronounced. As a rule it is therefore impossible to obtain a satisfactorily flavored product merely by diluting it back to normal juice strength; it becomes necessary to dilute it a great deal further and to mask and fortify the juice flavor with orange (peel) oil. This largely restricts the use of concentrated citrus juices to the ade field, the average beverage containing about 6% juice. Thus 6:1 orange juice concentrate makes, per gallon, 100 gallons of beverage. This tremendous dilution limits severely the amount of concentrated citrus juices which this particular field can absorb.

Another factor limiting the usefulness of concentrated citrus juices specifically from the viewpoint of the California Orange Growers as means for disposing of excess crop fruit is the extraordinarily pronounced flavor deterioration of juice extracted from navel and Java oranges. On the whole these types of juice have been considered unsuited for industrial juice products.

It is the object of this invention to extend the usefulness of citrus juice concentrates in certain specific cases by eliminating the need for their extreme dilution and by providing a method for utilizing all types of oranges, included navels and Javas in the making of certain new citrus juice products.

By making it possible to incorporate concentrated citrus juices in larger amounts than hitherto has been the case (or to use them in less diluted form) and still retain a pleasing flavor and appearance and a suitable acidity of the finished edible product, certain new and palatable food products imparted with certain novel and desirable characteristics can be prepared, namely:

(a) Such palatable food products that contain a larger proportion of fruit juice constituents than hitherto has been the case. Example: Orangeades with higher juice content.

(b) Such palatable food products that contain certain juice constituents in a larger concentration than that in which they occur in the original juice. Examples: Vitamin C concentrate. Preserves. Household syrups.

(c) Such palatable food products imparted with certain combinations of juice characteristics which can advantageously be obtained by processing the juice in concentated form. Example: Jellies of sparkling clarity and rich in juice vitamins (vitamin C).

(d) Such palatable food products imparted with certain desirable characteristics of a certain fruit juice, but in case of which the flavor and appearance of this certain fruit juice is specifically not wanted. Example: "Cola" flavored and colored beverages containing citrus juice vitamins and natual sugars and acid buffers, "Cola" beverages being more popular than citrus juice ade beverages.

This invention provides a method whereby a clear orange juice concentrate is produced containing up to about 75% soluble solids, chiefly sugars, from which most of the natural acids have been removed, and in which the natural content of vitamin C or ascorbic acid is retained. I have found that in case of concentrated orange juice, from which the volatile flavor constituents have been removed during the evaporation under vacuum, the characteristic off-flavors, previously described, are somewhat related to the suspended solids and the cloud-producing matters in the juice. If I remove these matters entirely and clarify the concentrate in the manner herein described, these off-flavors disappear and a syrup is obtained of a neutral, clean taste of mellow sweetness and practically void of the orange juice flavor characteristics.

The keeping quality of this new orange juice concentrate is superior to that of ordinary concentrate, but it is not permanently resistant to average room temperatures of 60° F. and more. When stored for more than a few days it should be kept in cold storage of between 40° F. and freezing, as it otherwise tends to become turbid, lose its content of ascorbic acid, and develop off flavors. If kept in cold storage it keeps indefinitely. I have also found that if this new orange juice concentrate is diluted with a few times its weight of sugar syrup or materials of a high soluble solid content, the keeping quality is improved considerably. By converting the concentrate into certain food products, such as preserves and syrups, an improved keeping quality may be obtained sufficient to withstand the average distribution period for semi-perishable products at ordinary storage temperatures.

The daily requirements of vitamin C is from 20 to 90 mg., a substantial amount involving a substantial quantity of its sources, such as citrus and certain other fruits and certain vegetables. For the average person it is rather difficult to obtain his daily requirement, mainly due to high cost, the destructibility of the vitamin when exposed to ordinary cooking methods, and taste and habit; the average person prefers a diet which happens to be almost void of vitamin C. He is also as unable and unwilling to take medicine or tablets daily (and in this manner take vitamin concentrates) as he is to change his habitual diet. Surveys show widely occuring vitamin C deficiency symptoms, even when plenty sources for this vitamin are available. It therefore becomes desirable to find ways and means for incorporating an appreciable amount of vitamin C in the average person's accepted and hitherto vitamin C deficient diet, and especially in such products which he does not cook. As the retention of ascorbic acid requires the presence of free acid within a certain range of acidity and pH, only such popular and widely accepted types of food products which may contain free acid without disturbing their essential characteristics are suitable for vitamin C fortification, namely: preserves (including jams and jellies and marmalades, and sweets such as candies and candy centers); acidulated beverages; syrups; and certain acid dairy products.

Vitamin C has been identified chemically as ascorbic acid (or cevimatic acid). Synthetic ascorbic acid is manufactured and used as a substitute for the natural vitamin. Recent investigations have however shown that the fraction of citrus juices hitherto identified as vitamin C seems capable of producing certain physiological effects which synthetic ascorbic acid appears unable to cause, such as the capillary penetrability and fragility factor of citrus juices, by some investigators termed vitamin P. While few details have been definitely established as yet, it is by now generally accepted that citrus juices seem to contain certain, as yet, only partly known or unknown factors which cannot be identified as ascorbic acid or as the physiological effect of this material alone (in its synthetic form). Whether or not it is permissible to talk about a "vitamin C complex" comprising a number of constituents and factors among which ascorbic acid is merely one, or whether the full physiological effect of ascorbic acid in certain respects is conditioned by the presence and concentration of certain other constituents occurring in citrus juices, it seems at any rate permissible to assume that the naturally occuring vitamin C, as present especially in citrus juices, in conjunction with the various materials which naturally accompany it in such juices, constitutes a superior source for this substance. As to this invention, the term "vitamin C complex" as used herein shall be assumed to include all such vitamins and allied substances as are retained in the concentrate as a result of the process of my invention.

When citrus juices are extracted by the grinding of the whole fruit and screening, ordinarily certain bitter and unpleasant flavors develop in the concentrate due to the presence of certain peel constituents. Therefore the fruit is usually cut in half and the juice is extracted from each half by reaming, thus keeping the juice constituents away from those of the peel. This procedure, however, increases the manufacturing cost considerably in case of concentrates as per unit the extraction cost must be multiplied by the concentration ratio. It is therefore important that my invention eliminates the need for the more expensive reaming method and by the complete removal of the off-flavor producing peel constituents makes it possible to use the far cheaper grinding method for juice extraction.

Another manufacturing cost reducing feature of this invention concerns the method for removal from the juice the various precipitated and solid materials which it is part of this invention to provide ways and means for removing. Usually it is impossible to filter citrus juices, and especially orange juice. The pectic matters in the juice tend to form a film over the filter capable of stopping the flow entirely, even when filter aids, pressure and suction are used. For complete removal of such solids that cannot be removed by screening, high-speed, bowl-type centrifuges are used. Such equipment is expensive and its usage entails frequent cleanings of the bowl. It is therefore important that the complete removal of all solids by filtration is made possible by my invention.

For the purpose of overcoming what herein has been described as the acidity factor restricting the usefulness of concentrated citrus juices my invention comprises a method for the removal of the major part of the natural acid content of the juice. This removal may be performed by neutralization and precipitation. As agent any material may be used which disposes of the acidity without causing any undesirable secondary effects. Neutralization without precipitation does not seem recommendable. If sodium hydroxide is used, a presence of about 5-6% of sodium citrate will result in the finished concentrate which is undesirable for reasons of taste and physiological effects. Precipitation methods are preferable, and in the following description calcium hydroxide is used.

If an alkaline calcium material is added to citrus juices, and especially orange juice, a certain amount of calcium citrate is precipitated almost immediately, but the precipitation is not completed, even if the mixture is allowed to stand for several days at ordinary room temperature. A certain amount of calcium constituents remain in solution. If the juice is clarified after such an initial and incomplete calcium precipitation and then subjected to further concentration, thus changing the solubility conditions, an additional precipitate appears; eventually a syrup of a mealy consistency and full of coarse grains is obtained. My invention, however, provides a novel method for rapid and complete calcium precipitation followed by no retarded or further precipitation when the clear filtrate is subjected to subsequent concentration.

I shall now describe in details a specific instance in which the method contained in this invention was used to manufacture the novel products of this invention.

Navel oranges were used and the juice was extracted by grinding the whole fruit followed by screening. The solid screenings consisted chiefly of peel materials and juice pulp and could be used as raw material for the manufacture of pectin and orange oil. The juice fraction was immediately sent to a vacuum pan made of juice resisting materials, glass in the laboratory, stainless steel in the plant, and there subjected to evaporation under 28 inches of vacuum reducing the boiling point to below 95° F. A sample of the "original juice" (prior to concentration) was analysed for per cent soluble solids ($B_o$), determined by spindel or refractive index and expressed on Brix scale, and for acidity ($a_o$) by sodium hydroxide titration, using phenolphthalein as indicator, and expressed as per cent anhydrous citric acid; and for ascorbic acid content ($AA_o$) expressed in mg./cc. and determined by the dye method using 2,6 dichlorophenolindophenol, or by N/100 iodine titration of acid sample containing 6% of a mixture of 4:1 acetic acid and metaphosphoric acid and using starch as indicator; this latter and simpler and swifter method is particularly suitable in case of citrus juices which usually don't contain other reducing constituents than ascorbic acid in strongly acid solution. The analyses gave the following results:

Total soluble solids ($B_o$) _____per cent__ 12.3
Corresponding specific gravity ($Sp_o$) _____ 1.049
Acidity ($a_o$) as anh. citric acid____per cent__ 1.15
Ascorbic acid ($AA_o$) _____mg./cc__ .55

The juice was now concentrated until a soluble content of 46% was reached. Generally, this primary concentration is conducted until a suitable soluble solid content of the range from 20 to 50% is reached. The upper limit of this range is determined by the viscosity of the concentrate, dependent on both the soluble and the suspended solid content of the extracted juice. The concentrate should not become so thick that it becomes difficult to handle it during the following processing. On the other hand the juice should be concentrated as far as possible before it becomes too thick. The increasing advantage, up to a certain point, of processing the juice at a higher degree of concentration I have found is related to the following factors:

(a) The processing of the juice, consisting primarily of the precipitation by calcium and subsequent removal of the precipitate can usually only be brought to completion above a certain degree of concentration, varying somewhat between batches, the general lower limit being about 20% soluble solids in the concentrate. If the degree of primary concentration is too low a retarded calcium precipitation usually occurs in the filtrate.

(b) With higher degree of concentration the tendency is increased to form a calcium precipitate of a voluminous, compact character which is readily separated from a clear liquid by filtration.

(c) If the ultimate acidity of the highly concentrated finished syrup is to be sufficiently low to conform with palatability, the retained acidity of the juice, if the processing is performed on the original juice or when it has been insufficiently concentrated, tends to become temporarily inadequate for proper ascorbic acid retention.

When the primary concentration was completed the vacuum was broken and a certain amount of cacium hydroxide, suspended in about three times its weight of water, was added to the juice.

This amount of calcium hydroxide (K) to be added to the juice is so calculated that it will reduce the citric acid content of the juice to such a point that when the concentration subsequently is resumed, a certain desired acidity ($a_c$) will ultimately be reached at a certain concentration ratio by volume (C) defined by a certain total soluble solid content ($B_c$) of the finished concentrated juice. The ratio (R) of $B_c/a_c$ thus constitutes a fixed figure which is the same at any degree of concentration and also in the original juice. The stoichiometric ratio (S) of calcium hydroxide neutralizing anh. citric acid is 0.578. As certain pectates and other matters are also precipitated by the calcium hydroxide I have found it necessary to use an excess of 5% above the theoretical requirement of this material, leading to a factor for complete reaction (F) of 1.05 with which this theoretical requirement should be multiplied.

Thus the amount (K) of calcium hydroxide to be added to a batch of concentrated juice made from a volume (V) of an original juice of known acidity ($a_o$) and soluble solid content ($B_o$) and corresponding specific gravity ($Sp_o$) is determined by the equation:

(1)
$$K = F \times S(V \times Sp_o \times a_o/100 - V \times Sp_o \times B_o/(100 \times R))$$
(2)
$$K = 0.00607 \times V \times Sp_o(a_o - B_o/R)$$

In case of orange juice I have found that a value of 50 for R is generally suitable, and I have used it in the instance herein described. If an average value of 1.05 is used for $Sp_o$ an error of less than 0.5% is introduced within the ordinary of from 10 to 15% solid content of the original juice. Thus the amount of calcium hydroxide ($K_{(1000\ cc.)}$) to be added to the concentrate made from 1000 cc. of original juice is:

(3)
$$K_{(1000\ cc.)} = 6.36(a_0 - B_0/50)$$
(4)
$$= 0.1272(100 \times a_0/2 - B_0)$$

The corresponding special equation expressed in U. S. units for $K_{(100\ gal.)}$ as lbs. of calcium hydroxide to be added per hundred gallons of original juice is:

(5)
$$K_{(100\ gal.)} = 0.1064(100 \times a_0/2 - B_0)$$

In the instance which I am describing 20,000 cc. of juice was concentrated. As per the analyses of this juice already given and by means of the Equation 4 the amount of calcium hydroxide to be added to the juice after the primary concentration was found to be 116 grams which, suspended in 360 cc. of water, was added.

When later the concentration of the treated and filtered partly concentrated juice was resumed and continued to a soluble solid content of 72%, the acidity of the finished concentrate was thus 72/50 or 1.44% anh. citric acid. This method, while removing the acid content, retains in solution the natural buffering materials. It is therefore usually impossible to titrate this final acidity as no clear end point can be had. In some cases the free acidity can only be calculated by subtracting the acid that has been neutralised by a known quantity of calicum hydroxide from the original acid content of the juice.

After the addition of the calcium hydroxide to the partly concentrated juice the mixture was heated to about 170° F. I have found that by this heat treatment a complete precipitation of the various insoluble matters is attained and that the solid phase of the mixture is converted into such a form that it can be completely and readily removed from the liquid phase by filtration.

The lower temperature limit for this heat treatment is determined by the degree of heat below which the desired effect is attaind too slowly or not at all, and I have found it to be about 120° F. The upper temperature imit is controlled by the sensitivity of the ascorbic acid to combined heat and oxidation, and approaches the boiling point of the syrup. I have however found that in all cases when a maximum temperature of 170° F. was used a satisfactory and complete precipitation and coagulation of solid materials was obtained, and that heat treatment above this temperature is needless.

The ascorbic acid content of the juice may be further protected during the heat treatment by filling the air space of the kettle with carbon dioxide of nitrogen or any inert gas, as ascorbic acid is rather heat resistant when no oxygen is present. I have however found that the ascorbic acid loss during this heat treatment is usually insignificant when no particular precautionary measures are taken, so no urgent need seems to exist for such steps. Altogether the ascorbic acid loss entailed by the entire procedure herein described usually amounts to a couple of percent and exceeds rarely 5%.

When the maximum temperature is reached the juice should usually be held there for a short period of time. The exact length of this holding time is not particularly important, and it may vary from a few seconds to about five minutes, the outer limits being defined by the same considerations as those determining the upper and lower temperature limits for the heat treatment.

I have found one instance in which no heat treatment was needed, but I consider this instance exceptional. In all average cases a heat treatment is required. Altogether, it must be emphasized that the natural characteristics of individual citrus juices may vary a great deal. It is always possible to experience such exceptional cases in which a certain batch of citrus juice behaves contrary to rules. But in case of industrial production of juice products such exceptional cases are of little significance. The policy must be to apply a universal procedure whether in each individual case the need therefor truly exists or not.

After the holding time at the maximum temperature has elapsed the juice should be cooled as rapidly as possible to below 100° F. In the particular instance herein described the cooling was obtained by turning on the vacuum. A violent boiling followed and through the heat removal by the rapid evaporation the temperature was reduced to less than a 100° F. in a few minutes.

It was now possible to separate the liquid from the solid materials by filtration using an ordinary pressure or suction filter. If occasionally the filtrate should appear slightly turbid, brilliant clarity may be obtained by adding about one per cent of infusorial earth or a similar filter aid to the filtrate and re-filter. At times I have found it advantageous to add a small amount (about 20%) of such a filter aid to the calcium hydroxide before this material was added to the juice.

As to what chemically takes place during this procedure it seems reasonable to assume that along with the calcium citrate precipitation certain columinous, spongy, insoluble calcium pectates are formed in conjunction with a coagulation of proteid matters. As to the procedure and its objectives the role of this voluminous precipitate seems to be two-fold: (a) it tends to bring down all suspended and colloidal and supersaturated materials, the true solubility of the various calcium materials apparently being nil at this high total solid content of the liquid phase since no further precipitate tends to occur during subsequent concentration of the filtrate; (b) the bulky solids act as excellent filter aid, forming a heavy cake on the filter delivering a clear filtrate.

A considerable quantity of liquid adheres to this precipitate and may, unless recovered, amount to a substantial loss in yield. By twice washing this precipitate with its weight of warm, distilled water the yield, gauged by sugars and ascorbic acid content, was raised about 10%. It is characteristic of the chemical processes involved in this procedure, that if these wash fractions are added to the original filtrate, consequent concentration will tend to produce a turbid syrup. Apparently certain calcium materials reenter the solution in the wash fractions which are low in soluble solids. These wash fractions should therefore not be added to the regular clear filtrate of the same batch, but to the juice of the new batch during the primary concentration and prior to the calcium treatment.

I have also observed that unless rather extensive de-acidification and consequent heavy precipitation of calcium materials is performed, the filtrate does not tend to remain clear during subsequent concentration. In the instance herein described about 80% of the acid was removed, and the finished concentrate was clear. In cases when I have removed only a minor fraction, or about 20%, of the natural acid content, the filtrate did not remain clear. The optimum effect of the precipitate was not reached. Altogether, it seems necessary, in case of orange juice, to remove well about 50% of the natural acid content to obtain a permanently clear filtrate and concentrate. In such cases when the flavor of the ultimate palatable product only requires a limited de-acidification, the major part of the natural acid must therefore nevertheless be removed. If the flavor of the ultimate product calls for more acid it must be re-incorporated.

After the precipitation treatment and the filtration, the concentration of the clear filtrate is resumed. In the present instance the concentration was continued until a soluble solid content of 72% was reached.

The finished product appears as a clear, amber syrup, almost odorless. As to flavor, the orange juice character has been removed except for the pleasing, mellow sweetness of the natural sugars and the smoothness of the buffered acidity. The taste is sweet, neutral, and pleasant. When navel oranges are used it is slightly bitter. Valencia concentrate is more reddish in color.

The concentration ratio (C) of the finished concentrate is determined by the equation:

$$(6) \quad C = \frac{B_c \times Sp_c}{B_i \times Sp_i}$$

as $B_c$ and $Sp_c$ indicate the total solid content and the specific gravity of the concentrate, $B_i$ and $Sp_i$ the same features of a juice containing the soluble solids of that of the original juice less the acid which has been removed. Thus:

$$(7) \quad B_i = B_o - (a_o - B_o/R) = B_o(1 + 1/R) - a_o$$

Using these equations for calculating the concentration ratio by volume in the particular instance herein described, a value of 8.35 was obtained.

If the original juice contained $AA_o$ mg./cc. of ascorbic acid, the theoretical content on this material in the concentrated juice, $AA_c$ mg./cc., is:

$$(8) \quad AA_c = C \times AA_o$$

Using this Equation 8 in the instance herein described the theoretical ascorbic acid content of the concentrate was calculated to be 4.60 mg./cc. Analyses revealed a content of 4.44 mg./cc., indicating a loss during the processing of 0.16 mg./cc. or 3.5%.

The Equations 6, 7, and 8 show that if a high ascorbic acid content is wanted in the concentrate, original juices of low total solid and high acid and ascorbic acid content should be used; and that on the other hand juices high in sugar and low in acid and ascorbic acid are not so desirable. Ripe Valencia juice, the type most useful for canning and other juice products, belong to this latter classification. Thus my invention is especially adaptable for utilization of such types of orange juices which otherwise are unsuited for remunerative by-products manufacture.

The upper limit for suitable solid content of the concentrate is determined by the point when the liquid becomes so viscous that its removal from the vacuum pan and its transfer between containers, especially at cold storage temperatures, becomes difficult and wasteful. The lower limit is determined by resistance against microorganism at sufficient soluble solid content, and by the desire for reducing, to the limit, storage and container and transportation costs by higher concentration ratios. Thus this range covers from about 64 to 82% total soluble solids, 72% usually providing the most suitable conditions.

As to the range for suitable acidity of the finished concentrate, which determines the extent to which the de-acidification should be carried, the situation is being complicated by the strong effect of the various buffering constituents of the juice which are being retained after the acidity, which naturally accompanies them, has been partly removed. It therefore become necessary to express the limits of this range both in terms of free acid present in the concentrate (as per cent anhydrous citric acid) and in terms of pH.

The upper acidity limit (or lower pH limit) is determined (a) by the point when the product becomes so acid and sour that it is no longer palatable, and (b) by the need for sufficient acid removal so that complete precipitation can be accomplished during the treatment previously described. Therefore, in case of orange juice this upper acidity limit is about 3%. Such an acidity would however be entirely unpalatable if not strongly buffered. The product is however, specifically characterised by its high buffer content which brings the pH of this high acidity within the pH limit of pH 3 for palatability.

Likewise it is necessary to determine both the lower acidity limit and the higher pH limit. The available literature maintains that ascorbic acid is rapidly being destroyed if the pH gets above 4. I have however found that samples of the new orange juice concentrate herein described of a pH approaching 6 retained a high ascorbic acid satisfactorily. The usual pH range for these new orange juice concentrates is pH 4.4–5.4.

My storage tests for ascorbic acid retention have brought out the following conclusions: In non-buffered or slightly buffered acid solutions, which thus contain just about enough acid to produce the measured pH, and which are low in soluble solids or sugars, the ascorbic acid is rapidly destroyed, even in cold storage. On the other hand I have found that in highly buffered acid solutions, rich in sugars, and thus of relatively high acidity, the ascorbic acid may be retained indefinitely even if the pH approaches pH 6. If ordinarily lower acidities are associated with higher pH values, the opposite seems to be the case when acid content limitations are determined for ascorbic acid retention.

Thus the lower acidity limit for proper ascorbic acid retention is about 0.2% as anhydrous citric acid, and the upper pH limit is about pH 6, the two values mentioned being not correspondent, but antagonistic.

These findings must also be considered when the concentrate is being diluted with non-acid materials for the purpose of providing suitable food products. Under these circumstances it usually becomes necessary to add free acid to the food product to retain the ascorbic acid.

These findings may also be interpreted in this manner: It is possible to raise the pH value of a liquid high in soluble solid content considerably above the usual upper limit of pH 4 for proper ascorbic acid retention, and still prevent deterioration of this material, if at the same time the content of both acid and buffer materials is substantially increased, and until pH 6 has been reached.

This is important in case of vitamin concentrates containing vitamin C in conjunction with such other vitamin materials which tend to deteriorate in flavor or potency if exposed to active acidity of pH 4 or less. My invention therefore not only provides a material, namely the new concentrated orange juice, containing vitamin C complex and of a pH higher than 4, which may be used as a base for the incorporation of other vitamin materials, but it also provides a general method for incorporation of ascorbic acid, natural or synthetic, in conjunction with other vitamin materials in a syrup of a pH higher than four and less than six.

The orange juice concentrate made in the particular instance herein described was palatable and directly edible. A teaspoon of it, or 5 cc., contained 22 mg. of ascorbic acid or about the daily minimum requirement of an adult. As its aromatic materials had been removed during the vacuum distillation, a small amount of alcoholic orange oil extract was added to a portion of it to provide some volatile flavor. The concentrate kept indefinitely in cold storage. Its pH was 4.9.

Various parts of the batch of finished concentrate were diluted with various materials to make various types of food products which thus were imparted with a substantial content of vitamin C complex.

One portion was diluted with twice its volume of 60% sugar syrup, maple flavor extract and caramel coloring was added, and a household syrup was obtained, of a satisfactory keeping quality at cool room temperature. After 30 days storage at a temperature rarely going above 65° F. no flavor change and no appreciable (less than 3% of total content) of ascorbic acid had occurred.

Another portion was diluted with once its weight of corn syrup (82° Brix), and 1% tartaric acid and 1% pectin and a few drops of orange oil and vanilla extract was added, and a clear jelly was made, rich in vitamin C complex. As to procedure, the sugar and acid and pectin and some water was boiled together for a few minutes after which the orange concentrate and the flavoring extracts were added, and the jelly was poured into glasses and sealed. Less than 2% of the ascorbic acid content was lost during this procedure.

Another portion was diluted with four times its weight of strawberry jelly. As to procedure, the concentrated orange juice was added to the strawberry jelly after the final boiling so that the mixture was ready for pouring, the acid and pectin content of the jelly having been adjusted to the addition of the concentrate. A similar strawberry jam product and orange marmalade were prepared.

To another portion 4% citric acid and some "cola" flavor and caramel coloring was added. Some of this mixture was poured into a bottle and there diluted with 6 times its volume of carbonated water, containing about 4 volumes of carbon dioxide, and the bottle was crowned. Thus a popularly flavored beverage was made, containing only the natural sugars of orange juice and no added sucrose, and rich in vitamin C complex. Another similar beverage was prepared, only a third of its syrup consisting of the orange juice concentrate, the two other thirds being made up of simple sugar syrup, for the purpose of providing a less expensive beverage.

One portion was diluted with 99 times its volume of buttermilk. No interference with the flavor of the buttermilk was noticed. Thus one quart of the buttermilk contained about 40 mg. of natural vitamin C complex, or twice the average human minimum requirement per day. After 48 hours cold storage about 10% of the ascorbic acid was lost. Similar additions were made to other acid dairy products, such as cottage cheese and sour cream. The pH of these products is high, the soluble content of solids is low, thus proving an unfavorable situation for ascorbic acid retention. However, a loss of less than 10% of original content of ascorbic acid in 48 hours seems to constitute a satisfactory keeping quality for this type of products.

The outline hitherto presented has entirely been based on orange juice concentrate. A similar product may be prepared from grapefruit juice. The finished concentrate is usually rather bitter in flavor.

When lemon juice is subjected to the procedure herein described a product of a somewhat different nature is obtained. Average lemon juice contains 8% solids of which 5% is citric acid. The ascorbic acid content is 0.45 mg./cc. If juice of this composition is converted into a concentrate of 72% soluble solids and a total solid:acid ratio of 50:1, the concentration ratio by volume is 31.5, the theoretical ascorbic acid content per cc. is 14.5 mg.

Thus an extremely potent vitamin C complex concentrate can be made in this manner, but it is usually dark in color and bitter and unpleasant in flavor. Its particular industrial significance is related to the fact that it amounts to a concentrate of the waste liquid from the citric acid manufacture, provided the acid neutralization during the manufacturing procedure is not carried beyond the point where the pH of the concentrated de-acidified juice is about pH 6. As such a concentrate may be obtained in large quantities as a by-product from the by-products manufacture of citric acid from lemons, it constitutes a suitable industrial raw material for the manufacture of ascorbic acid by various known methods.

Having thus described my invention, its mode of operation and the various new methods and products which it provides, it is to be understood that numerous changes and variations may be introduced without departing from the spirit thereof. All such changes and modifications as come within the scope of the following claims are embraced thereby.

I claim:

1. The process of concentrating citrus fruit juice such as orange juice and grapefruit juice to a total soluble solid content of between 72% and 82% which comprises extracting the juice, concentrating under vacuum, during concentration introducing a precipitating agent containing calcium ions, and removing the precipitate and suspended solids of the juice by filtration before completing the concentration.

2. The process of concentrating citrus juice which comprises extracting the juice, concentrating under vacuum, adding precipitating material containing calcium ions, maintaining the pH of the juice below 6, removing the resulting precipitate and suspended juice solids by filtration before the total soluble content has reached 50%, continuing the vacuum concentration beyond 50% soluble solids and permitting further precipitation to take place, and clarifying the concentrate.

3. The process of concentrating citrus juice to a soluble solids content of from 72% to 82% comprising extracting the juice, concentrating under vacuum, introducing precipitating material containing calcium ions, maintaining the pH of the juice below 6, removing the precipitate and suspended juice solids by filtration before the total soluble solid content has reached 50%, continuing the vacuum concentration beyond 50% soluble solids, permitting further precipitation to take place, clarifying the concentrate, and finally bringing the soluble solid content to 72% to 82% by concentration under vacuum.

4. The process of concentrating citrus juice which comprises extracting the juice, concentrating the juice under vacuum to between 20% and 50% of soluble solids, introducing a precipitating agent containing calcium ions, removing the precipitate and insoluble solids, maintaining the pH of the juice between 4 and 6, and further concentrating the juice to a total soluble solids content exceeding 72%.

5. The process of concentrating citrus juice which comprises extracting the juice, concentrating the juice under vacuum to a soluble solids content of 20% to 50%, adding an alkaline precipitating agent containing calcium ions in an amount sufficient to neutralize 50% to 80% of the citric acid content of the juice, maintaining the pH of the juice between 4 and 6, removing the precipitate and insoluble solids, and further concentrating to a total solids content exceeding 72%.

6. The process of concentrating citrus juice which comprises extracting the juice, concentrating the juice under vacuum to a soluble solids content of 20% to 50%, adding an alkaline precipitating agent containing calcium ions in an amount sufficient to neutralize 50% to 80% of the citric acid content of the juice, maintaining the pH of the juice between 4 and 6, removing the precipitate and insoluble solids, heating the juice and removing further precipitate resulting therefrom, and further concentrating to a total solids content exceeding 72%.

7. The process of concentrating citrus juice which comprises extracting the juice, concentrating the juice under vacuum to a soluble solids content of 20% to 50%, adding an alkaline precipitating agent containing calcium ions in an amount sufficient to neutralize 50% to 80% of the citric acid content of the juice, maintaining the pH of the juice between 4 and 6, removing the precipitate and insoluble solids, heating the juice to about 120° to 170° and removing further precipitate resulting therefrom, and further concentrating to a total solids content exceeding 72%.

8. The process of concentrating citrus juice which comprises extracting the juice, concentrating the juice under vacuum and in a non-oxidizing atmosphere to a soluble solids content of 20% to 50%, adding an alkaline precipitating agent containing calcium ions in an amount sufficient to neutralize 50% to 80% of the citric acid content of the juice, maintaining the pH of the juice between 4 and 6, removing the precipitate and insoluble solids, and further concentrating to a total solids content exceeding 72%.

9. The process of concentrating citrus juice which comprises extracting the juice, concentrating the juice under vacuum to a soluble solids content of 20% to 50%, adding an alkaline precipitating agent containing calcium ions in an amount sufficient to neutralize 50% to 80% of the citric acid content of the juice, maintaining the pH of the juice between 4 and 6, removing the precipitate and insoluble solids, further concentrating to a total solids content exceeding 72%, washing the precipitated matter with water and adding the wash water to a succeeding batch of juice during the initial period of concentration thereof.

10. The process of concentrating citrus juice which comprises extracting the juice, concentrating the juice under vacuum to a soluble solids content of 20% to 50%, adding an alkaline precipitating agent containing calcium ions in an amount sufficient to reduce the citric acid content of the juice to between 0.2% and 3.0% calculated as anhydrous citric acid in the final concentrate, maintaining the pH of the juice between 4 and 6, removing the precipitate and insoluble solids, and further concentrating to a total solids content exceeding 72%.

JORGEN DIETZ BERING.